(12) United States Patent
Flesch et al.

(10) Patent No.: US 8,313,145 B2
(45) Date of Patent: Nov. 20, 2012

(54) FITTING FOR A VEHICLE SEAT

(75) Inventors: Ralf Flesch, Solingen (DE);
Christopher Ryan, Fraser, MI (US)

(73) Assignee: Keiper GmbH Co. KG, Kaiserslautern (DE)

( * ) Notice: Subject to any disclaimer, the term of this patent is extended or adjusted under 35 U.S.C. 154(b) by 334 days.

(21) Appl. No.: 12/722,219

(22) Filed: Mar. 11, 2010

(65) Prior Publication Data
US 2011/0221249 A1    Sep. 15, 2011

(51) Int. Cl.
*B60N 2/22* (2006.01)
*B60N 2/02* (2006.01)

(52) U.S. Cl. .............................. 297/362.11; 297/378.12

(58) Field of Classification Search ............. 297/362.11, 297/362, 374, 378.12, 378.1; 16/239, 235
See application file for complete search history.

(56) References Cited

U.S. PATENT DOCUMENTS

| 5,350,216 | A  | * | 9/1994 | Ito ................................. 297/362 |
| 7,243,994 | B2 | * | 7/2007 | Cha ............................... 297/362 |
| 7,264,566 | B2 | * | 9/2007 | Dill et al. ...................... 475/164 |
| 7,571,962 | B2 |   | 8/2009 | Thiel et al. |

* cited by examiner

*Primary Examiner* — Milton Nelson, Jr.
(74) *Attorney, Agent, or Firm* — McGlew and Tuttle, P.C.

(57) ABSTRACT

A fitting (10) for a vehicle seat is provided having a seat part and a backrest. The fitting includes a first fitting part (11), a second fitting part (12) in geared connection with the first fitting part (11) for a relative rolling for adjusting the inclination of the backrest between several use positions, a drive motor for driving the relative rolling, a third fitting part (74) for manually free-pivoting of the backrest into a non-use position, the third fitting part (74) being releasable locked with a detent element (75), and a first coupling element (104) and a second coupling element (105) between the third fitting part (74) and the detent element (75). The first coupling element (104) and the second coupling element (105) are inactive in the normal case and become active in the misuse case, when the third fitting part (74) is unlocked and the backrest is in the non-use position and the drive motor is moving the detent element (75) backwards.

20 Claims, 5 Drawing Sheets

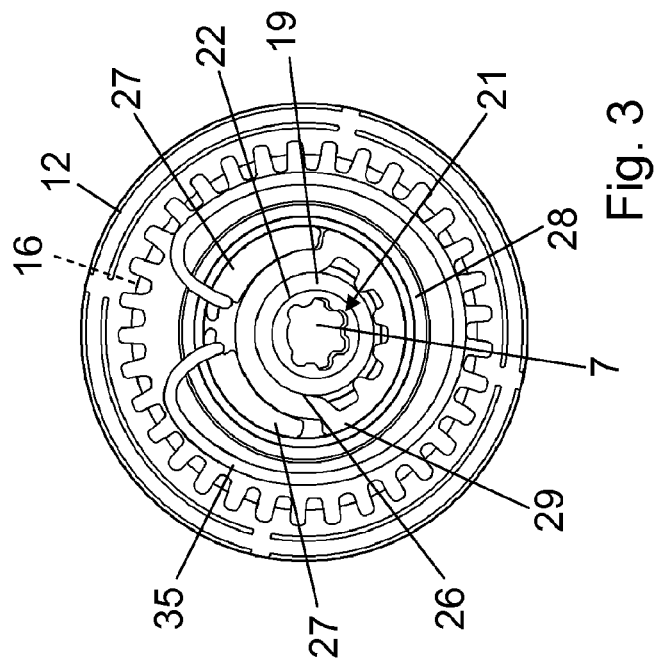
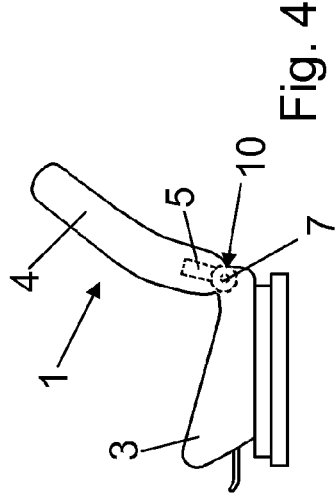
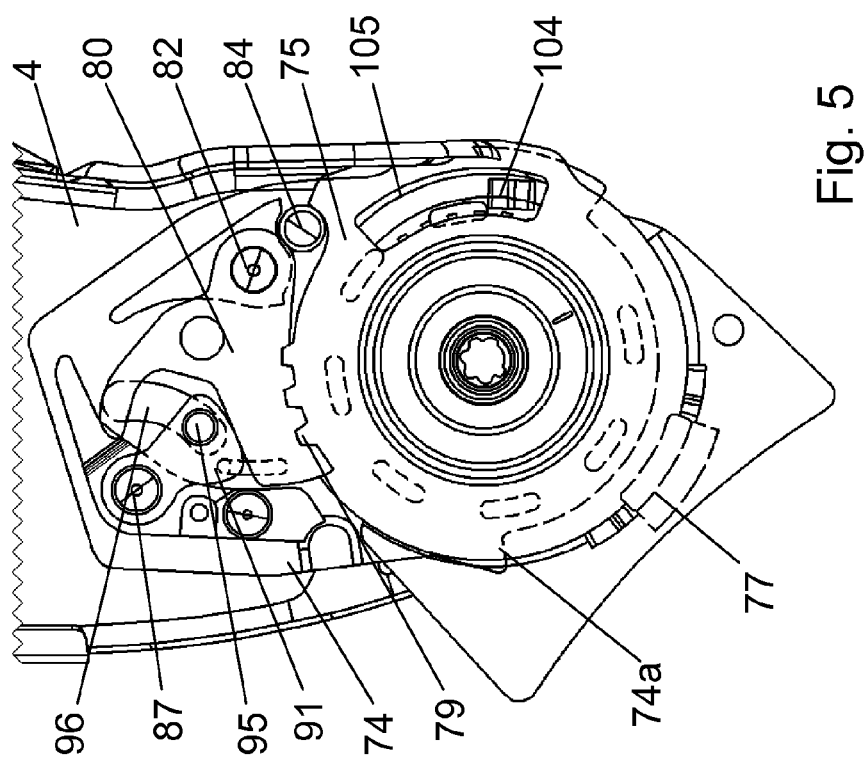

FITTING FOR A VEHICLE SEAT

FIELD OF THE INVENTION

An aspect of the present invention relates to a fitting for a vehicle seat having a seat part and a backrest, the fitting comprising a first fitting part and a second fitting part, wherein there is geared connection between the first fitting part and the second fitting part so that there can be relative rolling between the first fitting part and the second fitting part for adjusting the inclination of the backrest between several use positions, wherein the second fitting part is attached to the seat part; a rotatably mounted eccentric for being driven, and for causing the relative rolling between the first fitting part and the second fitting part in response to the eccentric being driven; a driver for driving the eccentric so that the eccentric causes the relative rolling between the first fitting part and the second fitting part; a drive motor for driving the driver, the drive motor being attached to the backrest, wherein the inclination of the backrest is adjusted by using the drive motor; a third fitting part being attached to the backrest and being pivotably mounted on the first fitting part around a central axis, wherein the third fitting is designed for being releasable locked with a detent element provided at the first fitting part, and the third fitting part is designed for free-pivoting the backrest forwards into a non-use position when the third fitting part is unlocked.

BACKGROUND OF THE INVENTION

A fitting of the type described above is disclosed in U.S. Pat. No. 7,571,962. The fitting is driven by a drive motor fixed to the backrest of the vehicle seat. The backrest may be freely pivoted into a non-use position without using the drive motor. A misuse situation will occur with the drive motor bringing the fitting to the rearmost adjustment position by rotating the drive shaft before the backrest is manually pivoted backwards (into a use position). When, after the drive motor stops, the backrest is manually returned from the non-use position, the stopped drive motor of the backrest further rotates the drive shaft due to internal self locking between the drive shaft an the drive motor. Depending on the limit of the rearmost adjustment position, parts, e.g. of the drive motor, may be destroyed.

BRIEF SUMMARY OF SOME ASPECTS OF THE INVENTION

An aspect of the present invention is the provision of improvements to a fitting of the type described above, in particular to avoid destruction in a misuse case.

In accordance with this aspect of the present invention, a fitting for a vehicle seat having a seat part and a backrest, comprises a first fitting part and a second fitting part, wherein there is geared connection between the first fitting part and the second fitting part so that there can be relative rolling between the first fitting part and the second fitting part for adjusting the inclination of the backrest between several use positions. The second fitting part is attached to the seat part. A rotatably mounted eccentric is provided for being driven, and for causing the relative rolling between the first fitting part and the second fitting part in response to the eccentric being driven. A driver is provided for driving the eccentric so that the eccentric causes the relative rolling between the first fitting part and the second fitting part. A drive motor is provided for driving the driver, the drive motor being attached to the backrest. The inclination of the backrest is adjusted by using the drive motor. A third fitting part is attached to the backrest and is pivotably mounted on the first fitting part around a central axis. The third fitting is designed for being releasable locked with a detent element provided at the first fitting part. The third fitting part is designed for free-pivoting the backrest forwards into a non-use position when the third fitting part is unlocked. A first coupling element and a second coupling element are provided between the third fitting part and the detent element and are inactive in a normal case and become active in a misuse case, when the third fitting part is unlocked and the backrest is in the non-use position and the drive motor is moving the detent element backwards.

In the normal case, the backrest manually leaves the non-use position. In the misuse case, the drive motor is used to move the detent element. Then, the backrest leaves the non-use position by means of the active first coupling element and second coupling element. The third fitting part may pass the moving detent element by means of gravity. The third fitting part and the detent element may be locked together before the drive motor reaches the limit for inclination adjustment.

The use of an eccentric planetary gear between the first fitting part and the second fitting part permits the angle of inclination of a backrest of the vehicle seat backrest to be steplessly adjusted. The fitting is operative by way of the relative rolling between the first fitting part and the second fitting part, which occurs in response to the eccentric being driven. One of the first and second fitting parts comprises a toothed ring, the other one a toothed wheel. The eccentric comprises two wedge segments mounted on a collar element and being mounted in the second fitting part. When the driver is not driven, the wedge segments are urged away from one another by a spring increasing the eccentricity of the spring-loaded eccentric which presses the toothed wheel into the toothed ring so as to lock the fitting. The driver is typically connected to the eccentric. Driving the driver, the wedge segments are brought together decreasing the eccentricity and allowing said relative rolling, i.e. the fitting is unlocked.

The driver (for drive motor driven embodiments) comprises a driving bushing and a driving ring, which are separate pieces. The driving bushing is used for driving the driving ring, and the driving ring is used for driving the eccentric by way of a driving segment. The driving ring is mounted on the collar element. The driving segment is designed to come into contact with the second fitting part in case of (e.g., in response to) a load. Thus, the fitting has a higher resistance with respect to load. A tilting of the driver is avoided. The flow of forces can also pass along the line: first fitting part with collar element, driving ring with driving segment, second fitting part (or vice versa).

The entire disclosure of U.S. Pat. No. 7,571,962 is incorporated herein by reference.

Other aspects and advantages of the present invention will become apparent from the following. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a partial section without free-pivoting unit;

FIG. 4 is a diagrammatic illustration of a vehicle seat;

FIG. 5 is a section of the exemplary embodiment in a use position;

DESCRIPTION OF THE PREFERRED EMBODIMENTS

Figure 1:
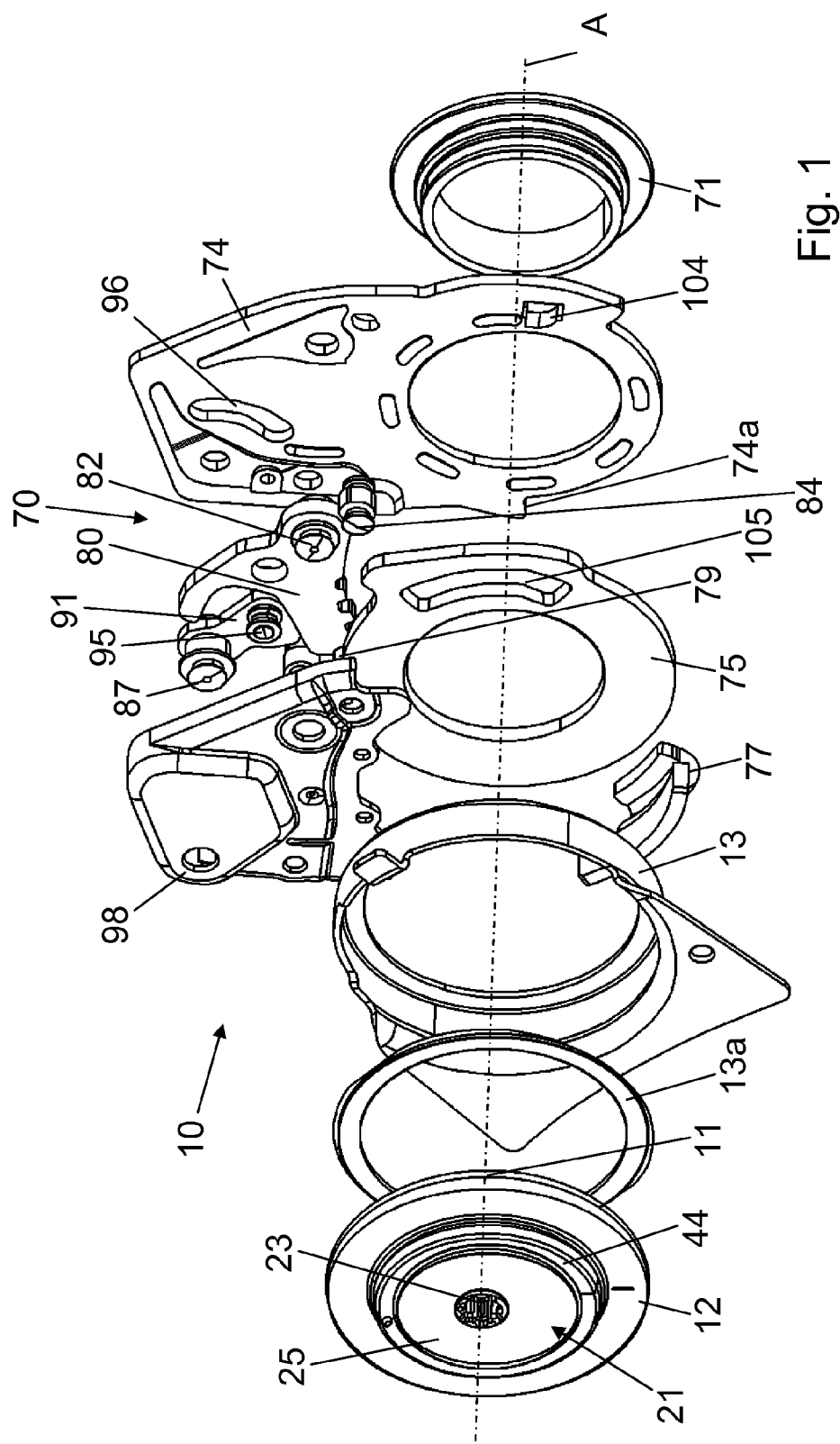
FIG. 1 is an exploded view of the exemplary embodiment according to the invention.
Figure 2:
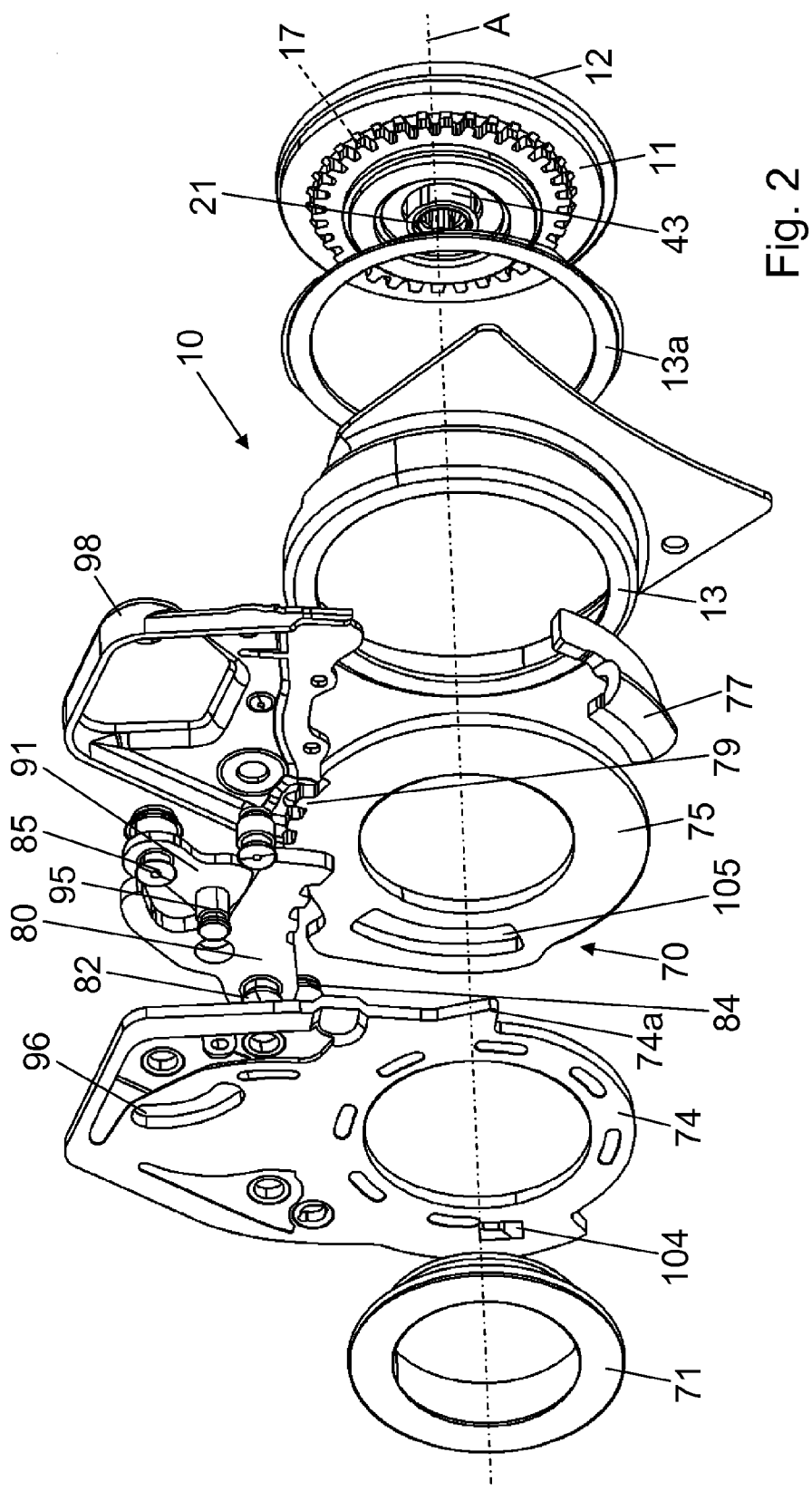
FIG. 2 is another exploded view of FIG. 1.

Referring now in greater detail to the drawings, in which like numerals refer to like parts throughout the several views, a vehicle seat 1 for a motor vehicle includes a seat part 3 and a backrest 4. For adjusting the inclination of the backrest 4, an electric drive motor 5 (or a hand wheel) is used to rotate a drive shaft 7. The drive shaft 7 is arranged horizontally in the transition zone between the seat part 3 and the backrest 4. The motor 5 is fixed to the backrest 4. On both sides of the vehicle seat 1, the drive shaft 7 engages in a fitting 10 in a rotationally fixed manner that will be described further below. The drive shaft 7 defines the directional data of a cylindrical coordinate system that is used in this description.

The fitting 10 is designed as a geared fitting in which a first fitting part 11 and a second fitting part 12 are connected with each other by way of a gear for the purpose of making and securing adjustments. More specifically, the first fitting part 11 and the second fitting part 12 are connected by way of an eccentric planetary gear,—in particular a self-locking planetary gear—as described, for example, in U.S. Pat. No. 6,619,743. The entire disclosure of U.S. Pat. No. 6,619,743 is incorporated herein by reference. An eccentric planetary gear for a manually driven fitting 10 is disclosed, for example, in U.S. Pat. No. 5,634,689. The entire disclosure of U.S. Pat. No. 5,634,689 is incorporated herein by reference.

The two fitting parts 11 and 12 are each disc-shaped and are made of steel. From a structural standpoint, the two fitting parts 11 and 12 together form a disc-shaped unit. A clamping ring 13 is provided in order to absorb the axially acting forces, i.e. to hold the fitting parts 11 and 12 together. The use of a clamping ring to hold parts together is described, for example, in U.S. Pat. No. 6,799,806. The entire disclosure of U.S. Pat. No. 6,799,806 is incorporated herein by reference. On one face side, the clamping ring 13 includes a radially inwardly bent edge by way of which it engages radially outwardly over the first fitting part 11, with a sliding ring 13a being interposed, without impeding the relative movement of the two fitting parts 11 and 12. The clamping ring 13 is fixedly connected to the second fitting part 12, preferably welded to the second fitting part 12. For this purpose, the clamping ring 13 comprises a radial outwardly projecting wing. The first fitting part 11 is assigned to the structure that carries the drive motor 5, i.e., in the exemplary embodiment, the first fitting part 11. In the exemplary embodiment, the clamping ring 13 is fixed to the structure of the seat part 3, and thus the second fitting part 12 is also fixed to the structure of the seat part 3. In another arrangement of the drive motor 5, or in the case of manually driven fittings, the positions of the fittings 11 and 12 can be interchanged.

In order to form the gear mechanism, a toothed wheel 16 with external toothing is embossed on the second fitting 12. A toothed ring 17 with internal toothing is formed on the first fitting 11. The toothed wheel 16 and the toothed ring 17 intermesh with each other. The radius of the tip circle of the external toothing of the toothed wheel 16 is smaller by at least the height of one tooth than the radius of the root circle of the internal toothing of the toothed ring 17. A corresponding difference of at least one tooth between the number of teeth in the toothed wheel 16 and in the toothed ring 17 permits the toothed ring 17 to roll on the toothed wheel 16, whereby there can be relative rolling (e.g., relative rotation) between the first fitting part 11 and the second fitting part 12. Thus, an eccentric planetary gear is provided.

Concentrically to the internal toothing of the toothed ring 17, the first fitting part 11 has an integrally formed collar element 19 on the side facing the toothed wheel 16. A driving bushing 21 is arranged with play by way of a hub 22 inside the collar element 19. The driving bushing 21 is made of plastic. The driving bushing 21 is provided with a receptacle (e.g., provided centrally with a borehole 23) for receiving the drive shaft 7. The profile of the borehole 23 matches the profile of the drive shaft 7, which in the exemplary embodiment is the profile of a splined shaft. Adjacent to its hub 22, the driving bushing 21 includes a step element having a larger diameter than the hub 22, followed by a cover disc 25 having a larger diameter than the step element.

Over part of its circumference—in the exemplary embodiment over slightly less than half the circumference—the step element includes a radially outwardly oriented external toothing with five teeth in the exemplary embodiment. In the area of the external toothing, the step element carries a driving ring 26 having internal toothing in certain areas. The internal toothing of the driving ring 26 engages positively and completely (e.g., with very little or no play) with the external toothing of the step element. Instead of the toothings, other positive-fit transmission profiles using ribs, polygonal shapes or similar are possible. In order to eliminate the play in the positive connection between the internal toothing and the external toothing, the positive fit can be achieved during assembly by displacing the material of step element.

The driving ring 26 is made of metal, especially steel, and may be sintered. The driving ring 26 includes a greater axial length than the step element. The driving ring 26 is therefore connected only over part of its axial length with the driving bushing 21 by way of the transmission profile. Furthermore, the driving ring 26 is rotatably mounted on the collar element 19, i.e. it is supported on the collar element's outer surface. The driving bushing 21 and the driving ring 26 together define a driver.

The driving ring 26 supports two wedge segments 27 which, by way of their curved outer surfaces, support a sliding bearing bushing 28 which is pressed in a rotationally fixed manner into the second fitting part 12. The driving ring 26 includes a driving segment 29 which engages with play between the narrow ends of the wedge segments 27 and which bears the internal toothing on its radially inward-facing side. The driving segment 29, the step element of the driving bushing 21 and a section of the borehole 23, together with the drive shaft 7, thus lie in one plane, whereby multi-axial stress states are avoided. Two projecting pins or, in general, lugs are integrally formed on the inwardly facing side of the cover disc 25 of the driving bushing 21, each with their end surfaces (e.g., tips) bearing on a respective one of the two wedge segments 27, to secure the wedge segments in the axial direction.

The broad ends of the wedge segments 27 face each other. Each of the broad ends of the wedge segments 27 accommodate, by way of a recess defined by projecting sections of material, an angled end finger of an annular spring 35. The spring 35 pushes (e.g., urges) the wedge segments 27 apart from one another in the circumferential direction, so that in the event of the wedge segments 27 becoming blocked during operation or if the backrest 4 comes up against a load, the radially outer, projecting sections of material (which are located at the broad ends of the wedge segments 27) may come into contact with and act upon one another.

The driving bushing 21 is secured axially on the outside of the first fitting part 11 by way of a clipped-on securing ring 43. A sealing ring 44 is provided on the outside of the second fitting part 12, between the embossing for the toothed wheel 16 and the cover disc 25 of the driving bushing 21. The sealing ring 44, which may be made, for example, of rubber, is mounted on the circumference of the cover disc 25.

The wedge segments 27 define an eccentric for at least partially controlling the relative rolling (e.g., relative rotation) between the first fitting part 11 and the second fitting part 12. More specifically, the wedge segments 27 define an eccentric which, by extension in the direction of the eccentricity, presses the toothed wheel 16 into the toothed ring 17 at an engagement point defined by the cooperative interaction between the toothed wheel, toothed ring and eccentric. When the drive force is provided by the rotating drive shaft 7, torque is transmitted first to the driver, i.e. the driving bushing 21 plus the driving ring 26, and then by the rotating driver to the eccentric, so that the eccentric slides along the sliding bearing bushing 28, changing the direction of the eccentricity and thus changing the point of engagement of the toothed wheel 16 in the toothed ring 17, which manifests itself as a wobbling rolling movement, i.e. as relative rotation with a superimposed wobbling motion. The inclination of the backrest 4 can thus be steplessly adjusted between several use positions.

During an unlocked state discussed in greater detail below, the backrest 4 can be freely pivoted by way of the fitting 10, e.g., in order to facilitate access to a row of seats behind the vehicle seat 1. For example, the backrest 4 can be separately unlocked and manually pivoted forwards into a non-use position, without moving the two fitting parts 11 and 12 relative to each other.

For free-pivoting, the fitting 10 comprises a free-pivoting unit 70. The free-pivoting unit 70 comprises an annular-shaped bearing ring 71 that has a radially projecting flange at one end face, and is fixedly connected to the first fitting 11, preferably by laser welding, at its other end face. The free-pivoting unit 70 further comprises a third fitting part 74 which is connected to the backrest 4, i.e. is fixed to the structure of the backrest 4. The plate-shaped third fitting part 74 is pivotably supported on the bearing ring 71, so that the third fitting part 74 is pivotable around the central axis A. The central axis A is defined by the center of the bearing ring 71 and aligned with the driving shaft 7 in order to permit manually, centered, free-pivoting relative to the first fitting part 11. Otherwise, however, the third fitting part 74 is locked (e.g., indirectly locked) with the first fitting part 11. For indirectly locking the third fitting part 74 with the first fitting part 11, the free-pivoting unit 70 comprises a separately formed, ring-shaped detent element 75. The detent element 75 is axially arranged on the bearing ring 71 between the first fitting part 11 and the third fitting part 74, i.e. axially adjacent to the third fitting part 74, and the detent part 75 is fixed to the bearing ring 71, preferably by welding. The detent element 75 may also by fixed to the first fitting part 11. In order to limit the range of free-pivoting in the forwards pivoting direction, a stopper 77 is provided which, in the exemplary embodiment, is attached to the clamping ring 13 (e.g. fixed to the circumferential surface or fixed to the wing) and is axially projecting. The third fitting part 74, which may be provided with a counterstopper 74a, comes to bear (with said counterstopper 74a) against the stopper 77 when the backrest 4 reaches the non-use position. In the same way, when the third fitting part 74 is locked with detent element 75, the stopper 77 may also limit the range of adjustment between the first and second fitting parts 11, 12. However, the range of adjustment between the first and second fitting parts 11, 12 is preferably limited by the control of the drive motor 5, e.g. by software. The stopper 77 may alternatively be provided at the second fitting part 12 or at the structure of the seat part 3.

The detent element 75 serves to lock the third fitting element 74. For this purpose, the detent element 75 includes toothing 79. A pawl 80 is pivotably mounted on the third fitting part 74 by way of a first bearing bolt 82. The pawl 80 is pivotable in the same plane as the detent element 75, and the first bearing bolt 82 runs parallel to the drive shaft 7. On the side facing the detent element 75 the pawl 80 is provided with toothing to interact with the toothing 79 of the detent element 75. A stop bolt 84 of the third fitting part 74 bears against the detent element 75 (i.e. against a radial projecting portion of the detent element 75) in the rearwards-pivoting direction of the third fitting element 74.

Parallel to the first bearing bolt 82, a second bearing bolt 87 is arranged on the third fitting part 74. By way of the second bearing bolt 87, a securing element 91 is pivotably mounted on the third fitting part 74. The securing element 91 is pivotable in the same plane as the pawl 80 and is acted upon by a spring (not shown). The securing element 91 secures the locked state of the third fitting part 74 by acting on the pawl 80 to hold it engaged in the detent element 75. An unlocking pin 95 projects axially from the securing element 91 and passes outwards through a slot 96 in the third fitting part 74. Apart therefrom, the pawl 80 and the securing element 91 are protected by a cover 98 on the third fitting part 74.

The free-pivoting unit 70 is preferably grouped together in a prefabricated assembly. For this purpose, the third fitting part 74 is provided with the stop bolt 84, the bearing bolts 82 and 87, the pawl 80, the securing element 91, the spring (not shown), the unlocking pin 95 and the cover 98. The fully assembled third fitting part 74 and the detent element 75 are slipped onto the bearing ring 71 and then the detent element 75 is fixedly connected directly to the bearing ring 71. This preassembled component is a testable unit whose functionality can be tested before further assembly of the fitting 10 takes place. The preassembled free-pivoting unit 70 is then installed by fixing the bearing ring 71 with the first fitting part 11.

Figure 6:
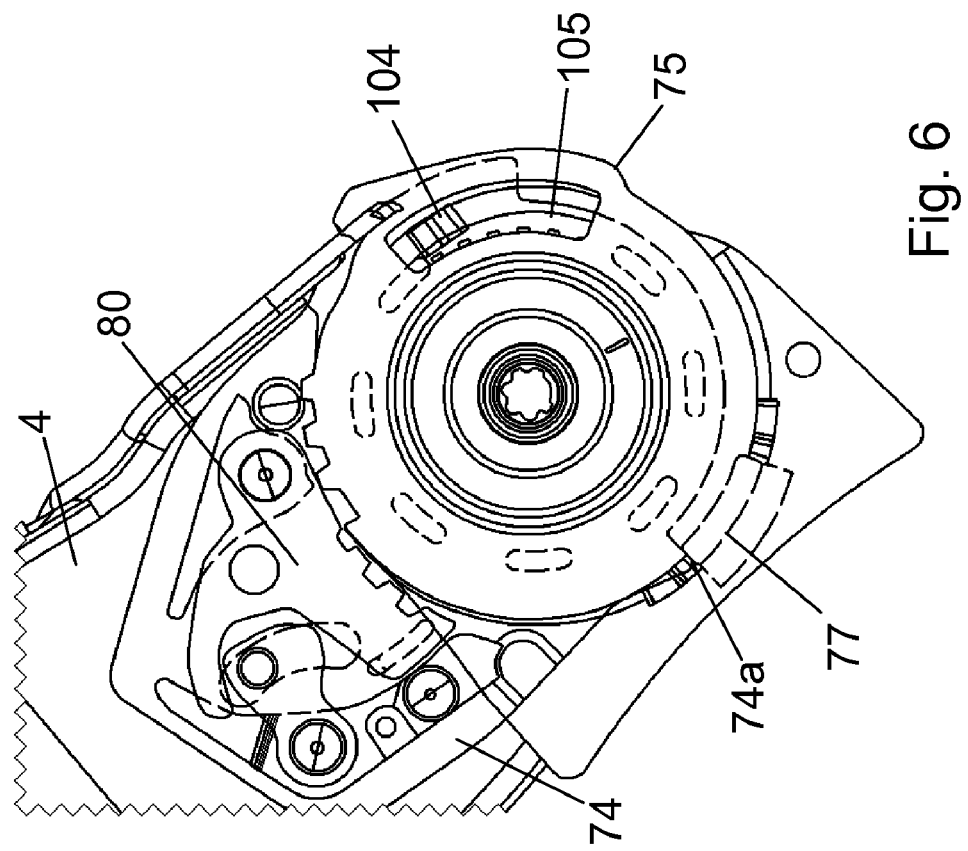
FIG. 6 is the section of FIG. 5 in the non-use position.

FIG. 5 shows a use position. In order to unlock the third fitting part 74—for example, by way of a manually operated lever for pulling a cable that is connected to the unlocking pin 95—the unlocking pin 95 is pivoted in the slot 96, thereby taking along the securing element 91 and pivoting the securing element relative to the pawl 80. The pawl 80 is then no longer acted upon. The pivoting securing element 91 comes to bear against an unlocking finger (e.g., a substantially radially projecting unlocking finger) on the pawl 80, thereby pulling the pawl open. The pawl 80 is thus completely disengaged. The backrest 4 can now be freely pivoted forwards, until the third fitting part 74, i.e. its counterstopper 74a, reaches the stopper 77. i.e. the backrest 4 reaches its non-use position (FIG. 6).

According to the invention, the third fitting part 74 is provided with a cam 104, arranged in an area opposite to the counterstopper 74a. The cam 104 axially projects into a slot 105 provided in the detent element 75, extending in the circumferential direction like an arc, and bent around the central axis A. The slot 105 has two ends, a front end and a rear end.

Figure 7:
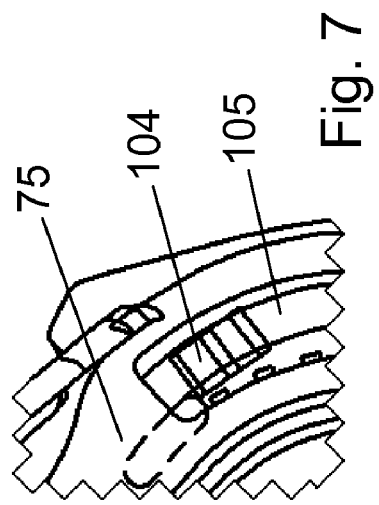
FIG. 7 is an enlarged part of FIG. 6 in the non-use position.

The extension of the slot 105, i.e. the distance of the front end and the rear end, is larger than the range of free-pivoting. When the counterstopper 74a bears against the stopper 77 in the non-use position (FIG. 6), a clearance (about 10°) between the cam 104 and the front end of the slot 105 occurs (FIG. 7). The cam 104 and the slot 105 form a first coupling element and a second coupling element, respectively, being active (interacting) between the third fitting part 74 and the detent element 75 in the misuse case.

In the normal case, when the backrest 4 is manually pivoted backwards from the non-use position, the stop bolt 84 comes to bear against the detent element 75, the pawl 80 again enters into its locking state and the securing element 91 secures this state. Then, the backrest 4 has reached a use position (FIG. 5). In the normal case, the coupling elements are inactive.

Figure 8:
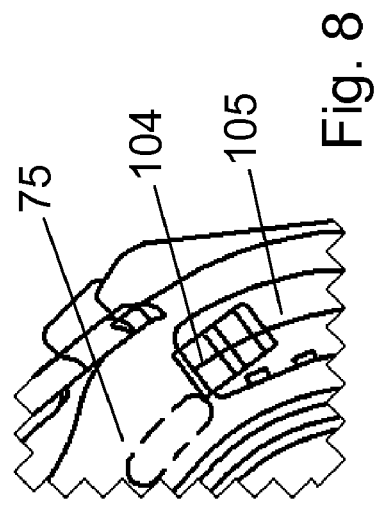
FIG. 8 is an enlarged partial section corresponding to FIG. 7 in a misuse case after the drive motor started to move the backrest backwards.
Figure 10:
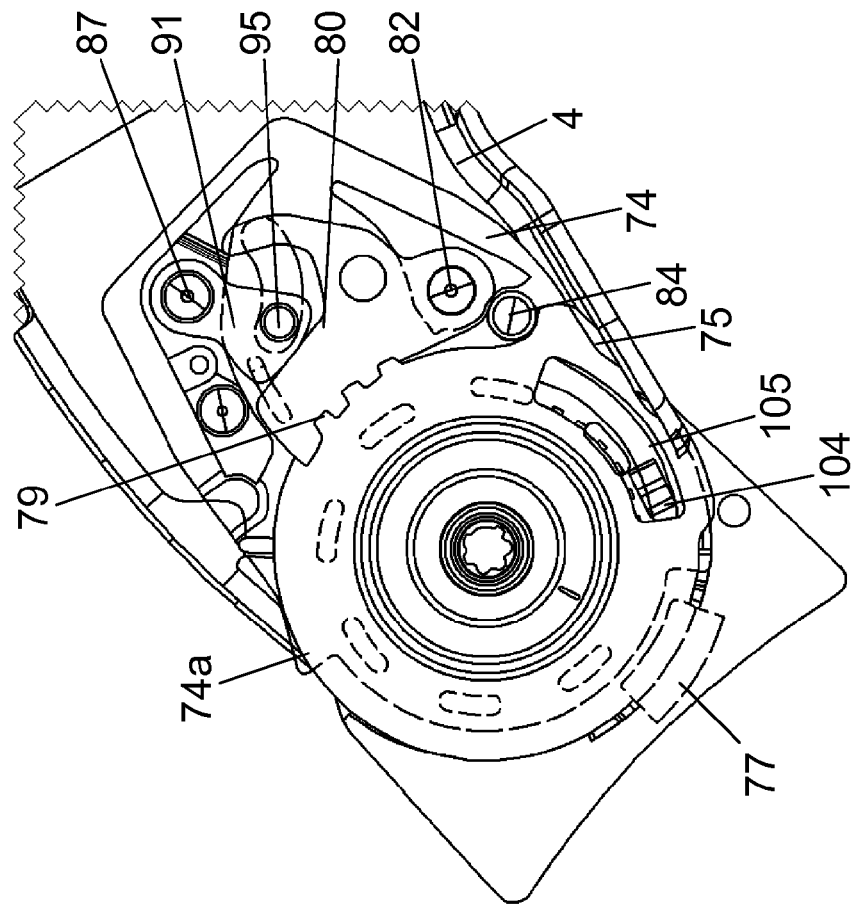
FIG. 10 is a section corresponding to FIG. 5 after ending the misuse case.
Figure 9:
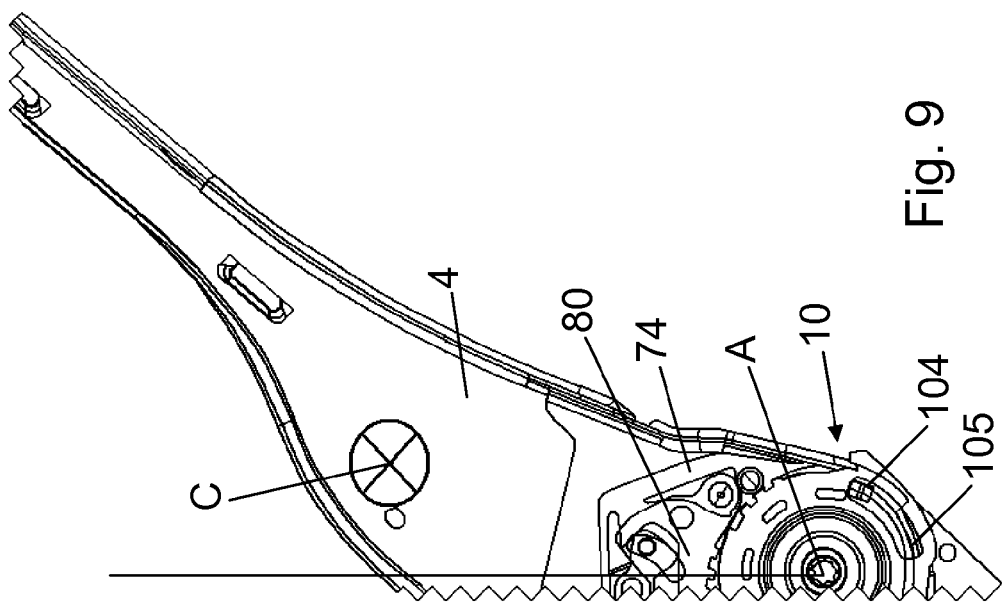
FIG. 9 is a section corresponding to FIG. 5 in the misuse case after the center of gravity passed the central axis.

In a misuse case, the driver motor 5 may be used for moving the backrest 4 backwards from the non-use position, i.e. into the backwards pivoting direction, by initiating the adjustment of the inclination of the backrest 4. The driver motor 5 drives the drive shaft 7, the drive shaft 7 drives the eccentric planetary gear, which results in the rolling movement of the first fitting part 11 into the backwards pivoting direction. As the detent element 75 is fixed to the first fitting part 11 (e.g. by means of the bearing ring 71), the detent element 75 with its slot 105 is moved backwards together with the first fitting part 11. Then, the front end of the slot 105 comes into contact with the cam 104 of the third fitting part 74 (FIG. 8). Now, the coupling elements are active (and interact). By the further movement of the first fitting part 11, the detent element 75 takes along the third fitting part 74 and the backrest 4 fixed to the third fitting part 74. When the center of gravity C of the backrest 4 passes the vertical line perpendicular through the central axis A (FIG. 9), the gravity pivots the backrest 4 backwards. A spring may be provided which supports this movement. The stop bolt 84 comes to bear against the detent element 75 before the first fitting part 11 reaches the limit of the range of adjustment. When the stop bolt 84 comes to bear against the detent element 75, the pawl 80 again enters into its locking state (for locking the third fitting part 74 and the detent element 75) and the securing element 91 secures this state (FIG. 10). A destruction, e.g. of internal parts of the drive motor 5, by a further rotation of the drive shaft 7 at the limit of the range of adjustment, is avoided.

It will be understood by those skilled in the art that while the present invention has been discussed above with reference to exemplary embodiments, various additions, modifications and changes can be made thereto without departing from the spirit and scope of the invention as set forth in the following claims.

While specific embodiments of the invention have been described in detail to illustrate the application of the principles of the invention, it will be understood that the invention may be embodied otherwise without departing from such principles.

What is claimed is:

1. A fitting for use with a vehicle seat having a seat part and a backrest, the fitting comprising:
    a first fitting part and a second fitting part, wherein there is geared connection between the first fitting part and the second fitting part so that there can be relative rolling between the first fitting part and the second fitting part for adjusting an inclination of the backrest between several use positions, wherein the second fitting part is attachable to the seat part;
    a rotatably mounted eccentric for being driven, and for causing the relative rolling between the first fitting part and the second fitting part in response to the eccentric being driven;
    a driver for driving the eccentric so that the eccentric causes the relative rolling between the first fitting part and the second fitting part;
    a drive motor for driving the driver, the drive motor being attachable to the backrest, wherein the inclination of the backrest is adjusted by using the drive motor;
    a third fitting part attachable to the backrest and pivotably mounted on the first fitting part around a central axis, wherein the third fitting part is designed for being releasably locked with a detent element provided at the first fitting part, and the third fitting part is designed for manually free-pivoting the backrest forwards into a non-use position when the third fitting part is unlocked; and
    a first coupling element and a second coupling element between the third fitting part and the detent element, the first coupling element and the second coupling element being inactive in a normal case and the first coupling element and the second coupling element becoming active in a misuse case, when the third fitting part is unlocked from the detent element and the backrest is in the non-use position and the drive motor is moving the detent element with a backwards movement.

2. A fitting according to claim 1, wherein the third fitting part and the detent element are arranged axially adjacent, and the first coupling element is an axially projecting cam and the second coupling element is a slot into which the cam is projecting.

3. A fitting according to claim 2, wherein the coupling elements become active when the cam comes into contact with one end of the slot in the misuse case.

4. A fitting according to claim 3, wherein the cam is provided at the third fitting part, and the slot is provided at the detent element.

5. A fitting according to claim 1, wherein the drive motor is moving the backrest backwards when the coupling elements are active.

6. A fitting according to claim 5, wherein gravity pivots the backrest backwards when a center of gravity of the backrest passes a vertical line perpendicular to the central axis.

7. A fitting according to claim 6, wherein the coupling elements become inactive when gravity pivots the backrest backwards.

8. A fitting according to claim 7, wherein the third fitting part and the detent element are locked when gravity has pivoted the backrest backwards into a use position.

9. A fitting according to claim 1, wherein a stopper is provided, and the third fitting part comes to bear against the stopper when the backrest reaches the non-use position.

10. A fitting according to claim 1, wherein the first fitting part and the second fitting part are held together by a clamping ring, thus forming a disc-shaped unit.

11. A fitting according to claim 10, wherein a stopper is provided at the clamping ring, and the third fitting part comes to bear against the stopper when the backrest reaches the non-use position.

12. A fitting according to claim 10, wherein the clamping ring is provided with a wing for mounting the fitting to the seat part.

13. A fitting according to claim 1, wherein there is a superimposed wobbling motion during relative rolling between the first fitting part and the second fitting part.

14. A fitting for use with a vehicle seat having a seat part and a backrest, the fitting comprising:

a first fitting part connectable to the backrest;

a second fitting part connectable to the seat part;

a geared connection between the first fitting part and the second fitting part to provide a relative rolling motion between the first fitting part and the second fitting part for adjusting an inclination of the backrest between several use positions;

a rotatably mounted eccentric for acting on the geared connection to cause relative rolling between the first fitting part and the second fitting part in response to the eccentric being driven;

a driver driving the eccentric;

a drive motor for driving the driver, the drive motor being attachable to the backrest, wherein the inclination of the backrest is adjusted in a forward adjusting direction and a backward adjusting direction by using the drive motor;

a third fitting part attachable to the backrest and mounted on the first fitting part for pivoting around a central axis;

a detent element connected to the first fitting part for releasably locking the third fitting part with respect to the first fitting part and releasing the third fitting part with respect to the first fitting part for manually free-pivoting the backrest forwards into a non-use position when the third fitting part is unlocked; and a first coupling element and a second coupling element providing coupling between the third fitting part and the detent element in an active state and not providing coupling between the third fitting part and the detent element in an inactive state, the first coupling element and the second coupling element being normally in the inactive state and the first coupling element and the second coupling element being in the active state in a misuse case comprised of the third fitting part being unlocked from the detent element and the backrest is in the non-use position and the drive motor is moving the detent element in the backward adjusting direction.

15. A fitting according to claim 14, wherein the third fitting part and the detent element are arranged axially adjacent, and the first coupling element comprises an axially projecting cam and the second coupling element comprises a slot into which the cam is projecting.

16. A fitting according to claim 15, wherein the coupling elements become active when the cam comes into contact with one end of the slot in the misuse case.

17. A fitting according to claim 14, wherein
the drive motor moves the backrest backwards with the coupling elements in the active state;
gravity pivots the backrest further backwards upon a center of gravity of the backrest passing a vertical position; and
the coupling elements become inactive when gravity pivots the backrest further backwards.

18. A fitting according to claim 17, wherein the third fitting part and the detent element are locked when gravity has pivoted the backrest backwards into a use position.

19. A fitting according to claim 14, wherein:
the first fitting part and the second fitting part are held together by a clamping ring, thus forming a disc-shaped unit; and
a stopper is provided at the clamping ring, and the third fitting part comes to bear against the stopper when the backrest reaches the non-use position.

20. A fitting according to claim 14, wherein:
the geared connection comprises a toothed wheel fixed to one of said first fitting part and said second fitting part and a toothed ring fixed to the other of said first fitting part and said second fitting part; and
the eccentric presses the toothed wheel into the toothed ring at an engagement point when drive force is provided by the rotating driver to the eccentric, with a resulting changing in a direction of the eccentricity and changing a point of engagement of the toothed wheel in the toothed ring resulting in a wobbling rolling movement.

* * * * *